United States Patent [19]

Myneni

[11] Patent Number: 5,703,281
[45] Date of Patent: Dec. 30, 1997

[54] ULTRA HIGH VACUUM PUMPING SYSTEM AND HIGH SENSITIVITY HELIUM LEAK DETECTOR

[75] Inventor: Ganapati Rao Myneni, Yorktown, Va.

[73] Assignee: Southeastern Univ. Research Assn., Newport News, Va.

[21] Appl. No.: 646,773

[22] Filed: May 8, 1996

[51] Int. Cl.⁶ .................................................. G01M 3/20
[52] U.S. Cl. ................................................... 73/40.7
[58] Field of Search ...................................... 73/40.7

[56] References Cited

U.S. PATENT DOCUMENTS

| | | | |
|---|---|---|---|
| 3,577,769 | 5/1971 | Roberts | 73/40.7 |
| 3,578,758 | 5/1971 | Altshuler | 73/40.7 |
| 3,762,212 | 10/1973 | Morley et al. | 73/40.7 |
| 5,049,168 | 9/1991 | Danielson | 73/40.7 X |
| 5,131,263 | 7/1992 | Handke et al. | 73/40.7 |
| 5,386,717 | 2/1995 | Toda | 73/40.7 |

*Primary Examiner*—Michael Brock

[57] ABSTRACT

An improved helium leak detection method and apparatus are disclosed which increase the leak detection sensitivity to $10^{-13}$ atm cc s$^{-1}$. The leak detection sensitivity is improved over conventional leak detectors by completely eliminating the use of o-rings, equipping the system with oil-free pumping systems, and by introducing measured flows of nitrogen at the entrances of both the turbo pump and backing pump to keep the system free of helium background. The addition of dry nitrogen flows to the system reduces backstreaming of atmospheric helium through the pumping system as a result of the limited compression ratios of the pumps for helium.

18 Claims, 2 Drawing Sheets

ULTRA HIGH VACUUM PUMPING SYSTEM AND HIGH SENSITIVITY HELIUM LEAK DETECTOR

The United States may have certain rights to this invention under Management and Operating Contract DE-AC05-84ER40150 from the United States Department of Energy.

FIELD OF THE INVENTION

This invention relates to improved ultra high vacuum (UHV) pumping systems and leak detectors of the type that employ helium as a tracer gas by the introduction of dry nitrogen. In particular, the invention is an improved leak detector that increases the leak detection sensitivity to $10^{-13}$ atm cc s$^{-1}$. The leak detection sensitivity is improved by completely eliminating the need for or frequent replacement of o-rings, equipping the system with oil-free pumping systems, and by introducing a measured flow of dry nitrogen to keep the system free of helium and hydrogen background. The addition of dry nitrogen to the system reduces backstreaming of atmospheric helium in the case of leak detectors and hydrogen in the case of UHV pumping systems even thoughthere is only a limited compression ratio at the pumps for helium or hydrogen.

BACKGROUND OF THE INVENTION

The design sensitivity of presently available helium (He) leak detectors is approximately $10^{-11}$ atm cc s$^{-1}$. It is difficult to achieve greater sensitivity with the presently available leak detection systems mainly due to the backstreaming of atmospheric helium through the pumping system as a result of their limited compression ratio for helium ($10^4$ to $10^7$).

Sensitivity of conventional leak detectors is also decreased by the continued outgassing of any o-rings in the system after the o-rings have been exposed to helium during previous leak checks.

Also, the sensitivity of conventional leak detectors is decreased by outgassing of helium from any oils used in pumps within the vacuum system. Still further, the ultimate pressure of a baked UHV system pumped by a turboomolecular pump is limited by high hydrogen background.

As described by these several limitations, leak detectors of the present art have not proven fully satisfactory in detecting leaks to a sensitivity greater than approximately $10^{-11}$ atm cc s$^{-1}$.

SUMMARY OF THE INVENTION

This invention consists of an improved leak detector for detecting a tracer gas such as helium in an Ultra High Vacuum (UHV) system. Sensitivity of the leak detector is improved to $10^{-13}$ atm cc s$^{-1}$ by eliminating o-rings and oils from the leak detection apparatus, by installing an aspirator with dry nitrogen (N2) at the exhaust stage of the backing pump, and by adding a small measured flow of dry N2 at the entrances of both the turbo pump and backing pump. The invention is also useful where high hydrogen background is a problem. In some instances o-rings may be tolerated if they are frequently replaced.

OBJECTS AND ADVANTAGES

One object of the present invention is to improve sensitivity of helium leak detectors by reducing backstreaming of atmospheric helium through the pumping system. This is accomplished by installing an aspirator with dry nitrogen (N2) at the exhaust stage of the backing pump, and by adding a small measured flow of dry N2 at the entrances of both the turbo pump and backing pump.

A second object of the invention is to improve the sensitivity of helium leak detectors by eliminating outgassing of helium from o-rings within the system. This is preferably accomplished by eliminating all o-rings from the vacuum and pumping systems.

Another object of the invention is to improve the sensitivity of helium leak detectors by eliminating outgassing of helium from oils within the system. This is preferably accomplished by eliminating all oils from the pumping systems.

A last object of the invention is to achieve lower ultimate pressures in an ultra high vacuum system. This is accomplished by connecting a nitrogen aspiration pump at the exhaust stage of the backing pump of a turbomolecular pumping system.

Other objects and advantages of the preferred embodiment will become apparent when reading the attached description of the invention with reference to the drawings.

DESCRIPTION OF THE INVENTION

Figure 1:
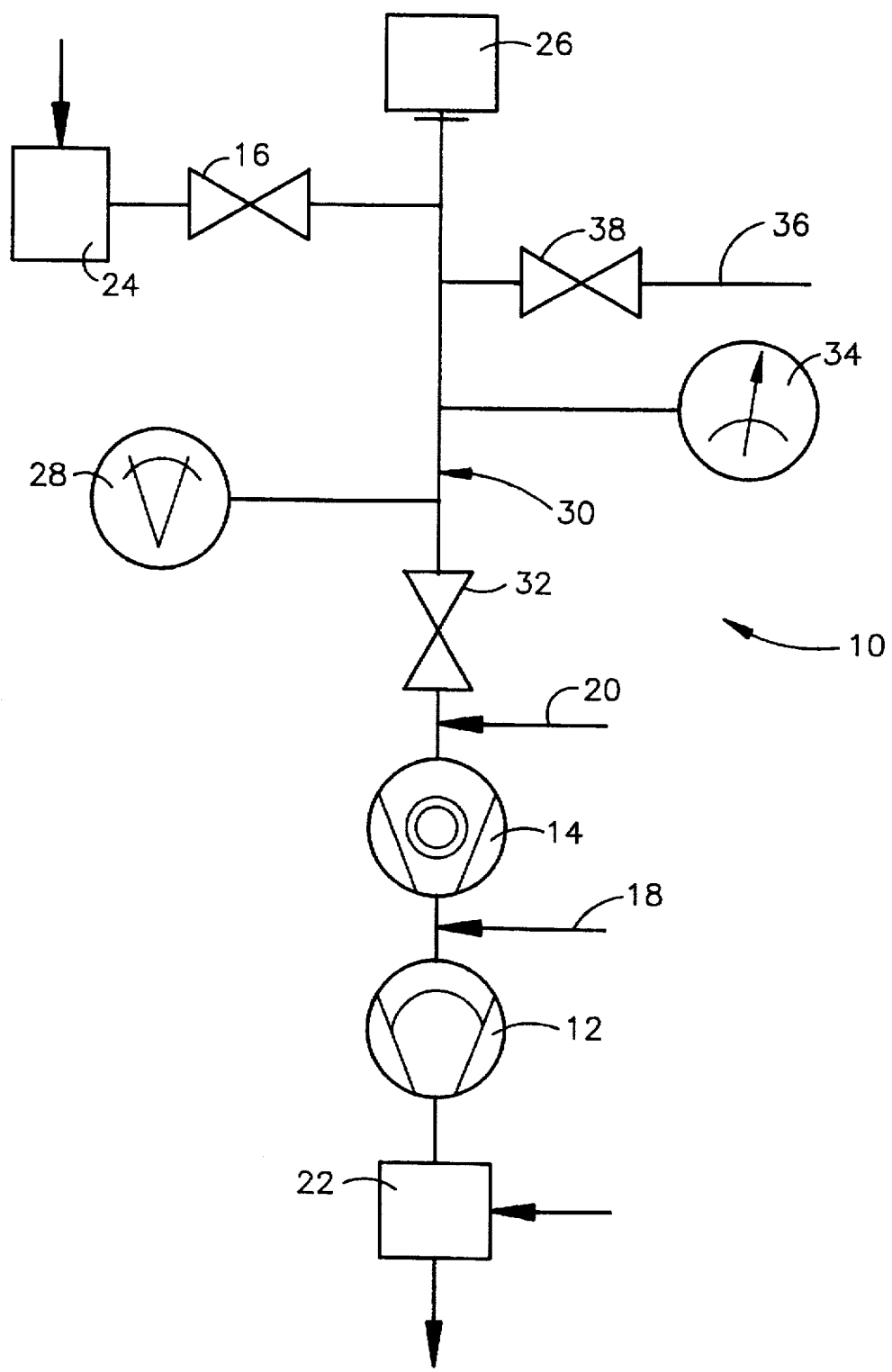
FIG. 1 is a schematic view of a preferred embodiment of this invention, an improved high sensitivity helium leak detector.

The preferred embodiment of the invention comprises an improved high sensitivity helium leak detector which is depicted in the schematic view shown in FIG. 1. The leak detector 10 includes a backing pump 12 which provides rough pumping of the system and a turbo pump 14. The test vessel 26 to be tested or leak checked is shown at the top of FIG. 1. The backing pump 12 may be considered a first stage pump and the turbo pump 14 a second stage pump. A measured dry nitrogen feed 18 is provided at the entrance to the backing pump 12. Another dry nitrogen feed 20 is provided at the entrance to the turbo pump 14. These feeds, 18 and 20, feed pure and dry nitrogen at a flow rate (atm cc s$^{-1}$) of $1 \times 10^{-1}$ to $1 \times 10^{-5}$ which is sufficient to prevent backstreaming but not of an amount to provide a pressure greater than the RGA will properly function at. Two aspirator or venturi pumps are provided with the system; the exhaust aspirator 22 is connected at the exhaust of the backing pump 12 and the evacuator venturi pump 24 is connected near the test vessel 26. A residual gas analyzer (RGA) 28 is provided in close proximity to the test vessel 26. An evacuator isolation valve 16 is provided between the evacuator venturi pump 24 and the common manifold 30. A pumping system isolation valve 32 is provided in the common manifold between the turbo pump 14 and the test vessel 26. A vacuum gauge 34 is connected with the common manifold 30. A purge dry nitrogen 36 line is provided near the test vessel 26 as well as a purge nitrogen valve 38.

The system is operated in the following manner to provide improved high sensitivity helium leak detection:

1) close the evacuator isolation valve 16, the pumping system isolation valve 32 and the purge N2 valve 38;

2) start the evacuator venturi pump 24 using dry nitrogen, the exhaust aspirator 22 using dry nitrogen, the backing pump 12, and the turbo pump 14, and insure that dry N2 flow is available to the purge N2 line 36, the N2 feed 18 to the backing pump 12, and the N2 feed 20 to the turbo pump 14;

3) provide a test vessel 26 to be tested for leaks and connect it to the leak detector system;

4) open the evacuator isolation valve 16 and let the evacuator venturi pump 24 pump the common manifold 30 down to 20 torr;

5) open the purge N2 valve 38 and purge the common manifold 30 (pumping system isolation valve 32 is closed) and test vessel 26 twice with dry N2 from the purge N2 line 36;

6) turn off the purge N2 36 by closing the purge N2 valve 38;

7) pump the common manifold 30 and test vessel 26 down to 20 torr with the evacuator venturi pump 24;

8) close the evacuator isolation valve 16;

9) open the pumping system isolation valve 32;

10) when the vacuum gauge 34 reads $10^{-6}$ torr, turn the RGA (residual gas analyzer) 28 on;

11) spray helium tracer gas on the outer surface of the test vessel 26; and 12) read the output of the RGA 28 (to $10^{-13}$ atm cc s$^{-1}$).

The backing pump 12 is typically a Varian diaphragm pump, Model MDP12, which is considered the rough or first stage pump and is capable of pumping the system down to $10^{-1}$ or $10^{-2}$ torr. Although the Varian diaphragm pump is preferred in this application, the backing pump could also be a rotary pump, a scroll pump, or a cryogenic pump or any pump that is capable of pumping down to $10^{-1}$ to $10^{-2}$ torr.

The turbo pump 14 is typically a Varian turbo pump, Model V70LP, which is considered the second stage pump and is capable of pumping the system down to $10^{-5}$ or $10^{-6}$ torr. Although the Varian turbo pump is preferred, the second stage pump could also easily be a diffusion pump or a cryogenic pump or any pump that is capable of pumping down to $10^{-6}$ torr. The pumps can be combined into a single two stage pump.

The backing pump 12 and turbo pump 14 work in conjunction to achieve a desired pressure of $10^{-6}$ torr in the common manifold 30 for the leak test. A first main pumping is done by the backing pump 12 to get the pressure at its inlet to $10^{-1}$ or $10^{-2}$ torr. The main pumping is then done by the turbo pump 14 until the pressure at its inlet and in the common manifold 30 is $10^{-6}$ torr. All the time that the pumps are pumping the system pressure down, the backing pump dry nitrogen feed 18 is feeding the inlet of the backing pump 12 at a rate of $1 \times 10^{-1}$ atm cc s$^{-1}$ and keeping He and H2 from backstreaming through the backing pump. As the pumps are operating, the turbo pump dry nitrogen feed 20 is also feeding the inlet of the turbo pump 14 and keeping He and H2 from backstreaming through the turbo pump 14 and assisting the backing pump nitrogen feed 18 in keeping He and H2 from backstreaming through the backing pump 12.

The vacuum gauge 34 is capable of reading from ambient pressure (760 torr) to $10^{-5}$ torr and is readily available. The vacuum gauge 34 can be connected through a programmable logic controller to the valves in the system to automatically open and close the valves in the proper sequence to automate the entire leak detection cycle, although the test vessel is still connected to the system manually.

The RGA 28 is typically an MKS Model PPT050 SEM. A mass spectrometer could also be used in place of the RGA 28.

The exhaust aspirator pump 22 and the evacuator venturi pump 24 are typically MDC-Venturi vacuum pumps, Model SUU-33.

None of the pumps in the system, the backing pump 12, the turbo pump 14, the exhaust aspirator 22 and the evacuator venturi pump 24, depend on o-rings or oil to achieve their pumping task. Therefore outgassing of helium from o-rings or oils, which would reduce the sensitivity of the leak detector, is eliminated from the pumping system.

Figure 2:
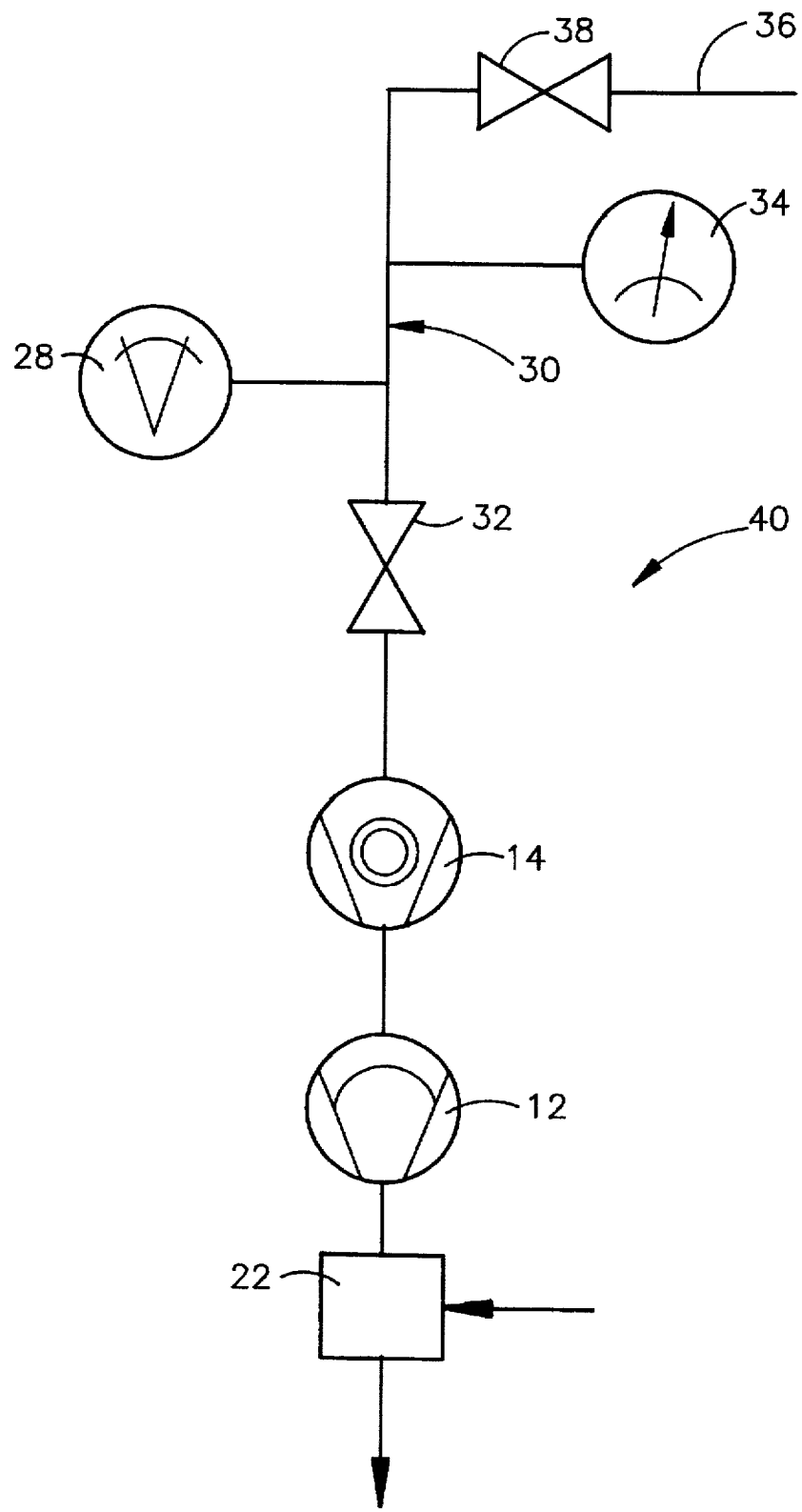
FIG. 2 is a schematic view of a second embodiment of this invention, an improved ultra high vacuum (UHV) pumping system.

The second embodiment of the present invention consists of an improved UHV (ultra high vacuum) pumping system. As shown in the schematic in FIG. 2, the parts in the UHV pumping system 40 are analogous to those of the high sensitivity leak detector of FIG. 1. Differences include the elimination of the evacuator venturi pump 24 and evacuator isolation valve 16. These components are unnecessary for the apparatus to be used as a UHV pumping system. The exhaust aspirator 22 is retained in the UHV pumping system and the use of dry nitrogen to prevent backstreaming of helium and hydrogen is critical and the nitrogen feed 20 will be used during baking of the UHV system for faster outgassing.

Hydrogen is the determining factor in getting the pressure very low. In the UHV pumping system 40 in FIG. 2, although the system is first baked to remove as much H2 as possible from the walls of the system, H2 still continuously desorbs from the walls of the vacuum chambers. As a result of the backstreaming of the H2, the H2 cannot be desorbed from the walls completely and therefore it limits the pressure that can be achieved with the pumping system. By adding the exhaust aspirator 22 and operating it during the bake out and afterwards, H2 is prevented from backstreaming from the ambient air and at the same time is eliminated from the system. The exhaust aspirator 22 therefore serves two purposes, the initial crude pump down and the subsequent prevention of the backstreaming. The ultimate pressure and consequently the outgassing of a UHV system can be drastically improved by connecting the exhaust aspirator 22 pump at the exhaust stage of the backing pump 12 of the system. Therefore, by appropriate modifications to operating procedures of many UHV systems in industrial processing systems product improvements may be easily accomplished. Furthermore, production costs can be reduced by the simplicity and low cost of the proposed modifications.

Although there has been shown and described an example of what is at present considered the preferred embodiment of the present invention, it will be obvious to those skilled in the art that various changes and modifications may be made therein without departing from the scope of the invention as defined by the appended claims.

What is claimed is:

1. A method of detecting a helium leak including the steps of:

(1) providing a pumping system including a roughing stage, a finishing stage, an evacuator pump, an exhaust pump, a dry nitrogen feed to the inlet of the roughing stage and finishing stage, a vacuum gauge, a common manifold, a purge nitrogen flow, a trace gas detector, an evacuator isolation valve between the evacuator pump and the common manifold, a purge nitrogen valve between the purge nitrogen feed and the common manifold, a pumping system isolation valve between the common manifold and the roughing and finishing stages, a test stand, and a test vessel;

(2) closing said evacuator isolation valve, said pumping system isolation valve, and said purge nitrogen valve;

(3) starting said evacuator pump, said exhaust pump, said roughing stage, and said finishing stage;

(4) providing dry nitrogen gas to said purge nitrogen flow and to said nitrogen feed to the roughing stage and finishing stage;

(5) connecting said test vessel to said test stand;

(6) opening said evacuator isolation valve;

(7) allowing said evacuator pump to pump said common manifold down to a rough vacuum on the order of 20 torr;

(8) opening said purge nitrogen valve and purging said common manifold and said test vessel twice with dry nitrogen from said purge nitrogen flow;

(9) turning off said purge nitrogen flow by closing said purge nitrogen valve;

(10) pumping said common manifold and said test vessel down to a rough vacuum on the order of 20 torr with said evacuator pump;

(11) closing said evacuator isolation valve;

(12) opening said pumping system isolation valve;

(13) allowing said pumping system to evacuate the system until said vacuum gauge on said common manifold reads in the range of $10^{-6}$ torr;

(14) turning said trace gas detector on;

(15) spraying helium tracer gas on the outer surface of said test vessel; and

(16) reading the output of said trace gas detector.

2. The method of claim 1 wherein said roughing stage is either a diaphragm pump, a rotary pump, a scroll pump, a cryogenic pump, or any pump that is capable of pumping from atmospheric pressure at its exhaust end down to $10^{-1}$ or $10^{-2}$ torr at its inlet end.

3. The method of claim 1 wherein said finishing stage is either a turbo pump, a diffusion pump, a cryogenic pump, or any pump that is capable of pumping from $10^{-1}$ torr at its exhaust end down to $10^{-6}$ torr at its inlet end.

4. The method of claim 1 wherein said vacuum gauge is capable of reading a range of pressures from 760 torr to $10^{-6}$ torr.

5. The method of claim 1 wherein said exhaust pump and said evacuator pump are venturi vacuum pumps that operate with dry nitrogen gas.

6. The method of claim 1 wherein said evacuator pump is capable of pumping said common manifold from atmospheric pressure to 20 torr when said pumping system isolation valve is closed, said evacuator isolation valve is open, and said purge nitrogen valve is open.

7. The method of claim 1 wherein said roughing stage nitrogen feed and said finishing stage nitrogen feed flow rates are controlled to prevent backstreaming of helium through the pumping system but not so high as to prevent said pumping system from achieving a pressure of $10^{-6}$ torr.

8. The method of claim 5 wherein said roughing stage nitrogen feed, said finishing stage nitrogen feed, said purge nitrogen flow and the nitrogen feeds to said exhaust pump and to said evacuator pump are all supplied with dry pure nitrogen gas to reduce the possibility of helium contamination.

9. The method of claim 1 wherein said roughing stage and said finishing stage may be replaced by a two stage vacuum pump which is capable of pumping from atmospheric pressure at its exhaust end down to $10^{-6}$ torr at its inlet end.

10. An apparatus for achieving high sensitivity helium leak detection comprising:

a pumping system including a backing pump, a finishing pump, an evacuator venturi pump, an exhaust aspirator pump, a dry nitrogen feed to the inlet of said backing pump, a dry nitrogen feed to the inlet of said finishing pump, a vacuum gauge, a common manifold, a purge nitrogen flow source, a residual gas analyzer, an evacuator isolation valve between said evacuator venturi pump and said common manifold, a purge nitrogen valve between said purge nitrogen flow source and said common manifold, and a pumping system isolation valve between said common manifold and said dry nitrogen feed to the inlet of said finishing pump;

a test stand; and a test vessel.

11. An apparatus for achieving a high vacuum consisting of:

a vacuum pumping system;

an inlet for said vacuum pumping system;

an outlet for said vacuum pumping system;

an exhaust pump driven by a source of dry nitrogen connected to said outlet whereby backstreaming of helium and hydrogen are reduced;

a source of purge nitrogen flow; and a purge nitrogen valve between said source of purge nitrogen flow and said inlet.

12. A method of achieving an ultra high vacuum including the steps of:

(1) providing a two stage pumping system including a roughing pump, a finishing pump, an exhaust pump associated with a dry nitrogen feed, a vacuum gauge, a common manifold, a purge dry nitrogen flow, a purge nitrogen valve between the purge dry nitrogen flow and the common manifold, and a pumping system isolation valve between the common manifold and the main pumping system consisting of said roughing and finishing pumps;

(2) closing said pumping system isolation valve and said purge nitrogen valve;

(3) starting said exhaust pump and dry nitrogen feed, said roughing pump, and said finishing pump;

(4) opening said nitrogen purge valve;

(5) opening said pumping system isolation valve;

(6) allowing said main pumping system and said exhaust pump to pull to as low a vacuum as possible;

(7) closing said nitrogen purge valve; and (8) allowing said main pumping system and said exhaust pump to achieve an ultra high vacuum in said common manifold while said dry nitrogen feed prevents backstreaming of helium and hydrogen.

13. The method of claim 12 wherein said roughing pump is either a diaphragm pump, a rotary pump, a scroll pump, a cryogenic pump, or any pump that is capable of pumping from atmospheric pressure at its exhaust end down to $10^{-1}$ or $10^{-2}$ torr at its inlet end.

14. The method of claim 12 wherein said finishing pump is either a turbo pump, a diffusion pump, a cryogenic pump, or any pump that is capable of pumping from $10^{-1}$ torr at its exhaust end down to $10^{-6}$ torr at its inlet end.

15. The method of claim 12 wherein said vacuum gauge is capable of reading a range of pressures from 760 torr to $10^{-6}$ torr.

16. The method of claim 12 wherein said dry nitrogen feed feeds nitrogen to said exhaust pump which is dry pure nitrogen gas to reduce backstreaming of helium and hydrogen so as to provide a better vacuum.

17. The method of claim 12 wherein said roughing pump and said finishing pump may be replaced by a two stage vacuum pump which is capable of pumping from atmospheric pressure at its exhaust end down to $10^{-6}$ torr at its inlet end.

18. The method of claim 12 wherein said ultra high vacuum is achieved by carrying out step 8 until the common manifold pressure is at least as low as $10^{-13}$ torr.

* * * * *